United States Patent
Enmeiji et al.

(10) Patent No.: US 6,793,036 B1
(45) Date of Patent: Sep. 21, 2004

(54) WORKING VEHICLE WITH TRANSVERSE SYSTEM

(75) Inventors: Yoshiyuki Enmeiji, Osaka (JP); Takeshi Nishikawa, Osaka (JP)

(73) Assignee: TCM Corporation, Osaka (JP)

( * ) Notice: Subject to any disclaimer, the term of this patent is extended or adjusted under 35 U.S.C. 154(b) by 0 days.

(21) Appl. No.: 10/182,045

(22) PCT Filed: May 8, 2000

(86) PCT No.: PCT/JP00/02945
§ 371 (c)(1),
(2), (4) Date: Jul. 24, 2002

(87) PCT Pub. No.: WO01/60733
PCT Pub. Date: Aug. 23, 2001

(30) Foreign Application Priority Data

Feb. 15, 2000 (JP) .......................... 2000-036006
Mar. 10, 2000 (JP) .......................... 2000-065850

(51) Int. Cl.⁷ .............................. B62D 9/00; B62D 5/06
(52) U.S. Cl. ....................................... 180/411; 280/103
(58) Field of Search ................................ 180/411, 414, 180/415, 408; 280/98, 103

(56) References Cited

U.S. PATENT DOCUMENTS

| | | | | |
|---|---|---|---|---|
| 2,863,518 A | * | 12/1958 | Pellizzetti | ................ 180/414 |
| 3,490,555 A | * | 1/1970 | Noack | ................... 180/411 |
| 4,079,807 A | * | 3/1978 | Hornagold et al. | ......... 180/414 |
| 4,823,899 A | * | 4/1989 | Ron | .......................... 180/411 |
| 4,986,387 A | | 1/1991 | Thompson et al. | |
| 5,722,504 A | * | 3/1998 | Gaetani | ..................... 180/411 |

FOREIGN PATENT DOCUMENTS

| | | |
|---|---|---|
| JP | 1-168580 | 7/1989 |
| JP | 2-306879 | 12/1990 |
| JP | 3-235762 | 10/1991 |

* cited by examiner

Primary Examiner—Kevin Hurley
(74) Attorney, Agent, or Firm—Fildes & Outland, P.C.

(57) ABSTRACT

A working vehicle with a transverse system, wherein when a traveling mode is switched to transverse traveling, a switching valve is switched to feed a full flow of pressure oil from a hydraulic pump to a flow divider. The flow divider controls the flow to allow a specified amount of flow to flow to a control valve for a hydraulic operating device. The control valve controls only the pressure oil required for steering to allow oil to flow to the hydraulic operating device so as to operate a hydraulic operating device to rotate both swing members about a vertical axis, thereby to steer both front wheels through 90 degrees. After both front wheels are steered, the vehicle can run transversely in lateral directions by controllably rotating both front wheels. When the traveling mode is switched to transverse traveling, misalignment of straight-ahead driving due to poor road surface conditions and weight imbalance can be corrected easily by operating the hydraulic operating device slightly to steer both front wheels facing inward or outward through a smaller angle. A specified amount of pressure oil can be fed through the flow divider to the control valve irrespective of the flow of the pressure oil from the hydraulic pump.

2 Claims, 12 Drawing Sheets

WORKING VEHICLE WITH TRANSVERSE SYSTEM

TECHNICAL FIELD

This invention relates to a working vehicle with transverse system, which can be switched to a transverse travel mode.

BACKGROUND ART

Conventionally, working vehicles having a transverse system have primarily been found among large size conveyance vehicles and some loaders, and reach style electric vehicles as forklifts. In addition, there exists a side forklift with a mast and forks installed sideways in relation to the movement direction of the vehicle to allow the vehicle to handle elongated objects. However, there are no counter balance type forklifts that can move sideways and function like a side forklift in addition to such tasks as generally required. To realize this type of forklift, the front wheels or driving wheels are required to be steerable sideways.

Figure 14:
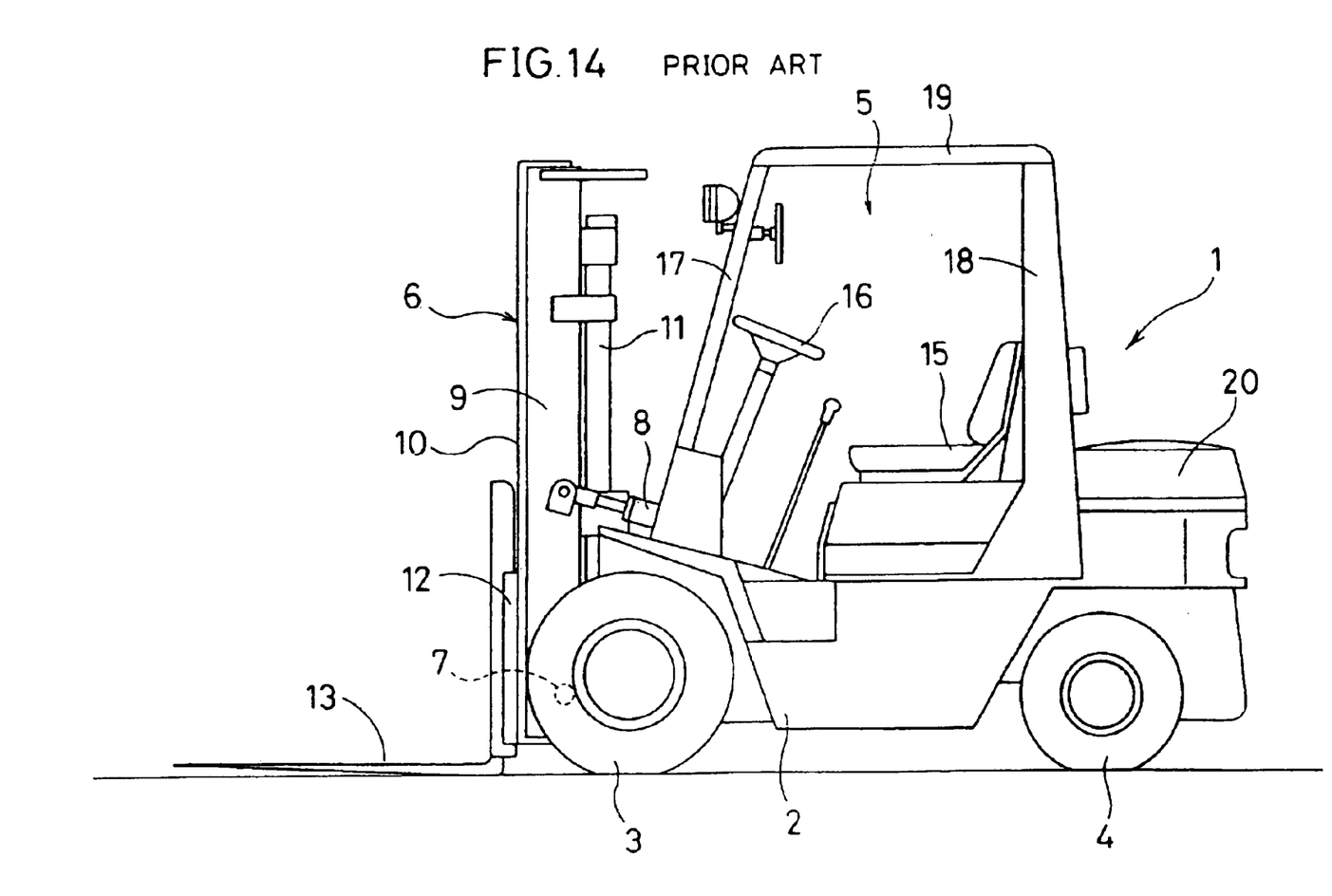
FIG. 14 is a side view of a forklift of a conventional art.

Therefore, a conventional forklift 1, shown in FIG. 14, has a pair of right and left front wheels 3 (driving wheels) in a front part of a vehicle body 2, a pair of right and left rear wheels 4 in a rear part of the vehicle body 2, and a driver's seat 5 on an upper front part of the vehicle body 2. A mast 6 capable of vertically extending and retracting is located at a front end of the vehicle body 2 to be able to tilt in a front-and-rear direction through a linking axle 7 extending in the direction of the vehicles' width. Additionally, tilt cylinders 8 enabling the mast 6 to tilt forward and backward are placed between the vehicle body 2 and the mast 6.

The mast 6 comprises a pair of right and left outer frames 9 and a pair of right and left inner frames 10 capable of vertical movement by being guided by the outer frames 9. Disposed between the outer frames 9 and the inner frames 10 is a lift cylinder 11. Additionally, lift brackets 12 capable of vertical movement by being guided on the inner frames 10 are provided, and a pair of right and left forks 13 are secured to the lift brackets 12 through a pair of upper and lower finger bars.

The above mentioned driver's seat 5 includes a seat 15, a steering wheel 16 located in front of the seat 15, and a headguard 19 disposed thereabove through front pipes 17 and rear pipes 18 which are erected on the vehicle body 2. A counterweight is located in the rear of the seat 15 on the vehicle body 2.

However, since the right and left front wheels 3 are driven in common by a same travel drive system, the above mentioned conventional forklift 1 cannot effect straight-sideways steering of the front wheels, thus being unable to move laterally.

DISCLOSURE OF INVENTION

The first objective of the present invention is to provide a working vehicle with a transverse system, in which driving front wheels can be steered straight sideways, and in the transverse travel mode, assisting in straight driving and attitude control such as changing a direction of a vehicle body (vehicle) can be achieved at a specified speed.

The second objective of the present invention is to provide a working vehicle with a transverse system, in which the driving front wheels can be steered straight sideways and angle adjustment of the front wheels can be made easily and precisely.

To achieve the first objective mentioned above, a working vehicle with a transverse system according to Claim 1 of the present invention comprises a pair of right and left front wheels and a pair of right and left rear wheels, respectively capable of steering, each of the pair of right and left front wheels being linked to a drive shaft on the travel drive system side, wherein each travel drive system is secured to a swing member capable of rotating around a vertical axis of the vehicle body, a means for rotating swing member is provided to allow a hydraulic operating device to rotate both swing members against each other, and a switching valve means is secured to a piping between a hydraulic pump and a working control valve, whereby the piping on a side to be switched by the switching valve means is connected to a control valve for the hydraulic operating device through a flow divider.

According to the above mentioned configuration of Claim 1 of this invention, the switching valve means during the normal travel mode is in a one-way switching condition, which will enable the full flow of pressure oil to be fed to the working control valve from the hydraulic pump. The hydraulically operating device is in the neutral position to steer the right and left front wheels in the front and rear directions. This type of working vehicle can drive both forward and backward and can operate various working functions through the working control valve.

Switching from the normal travel mode to the transverse travel mode is accomplished by switching a switching valve means into an opposite-way switching condition, thus full flow of pressure oil from the hydraulic pump can be fed directly to the flow divider which controls the flow to allow a specific amount of the flow to flow to the control valve for the hydraulic operating device.

This control valve for the hydraulically operating device controls only the pressure oil required for steering to allow oil to flow to the hydraulically operating device so as to operate the hydraulically operating device to rotate both swing members around a vertical axis, thereby to steer both front wheels through 90 degrees (steer straight sideways) in relation to the vehicle body. Because of the fact that both front wheels are respectively integrated with the travel drive system, the 90-degree steering can be achieved easily. Thus, after having steered both front wheels straight sideways, the front wheels are controllably rotated in either to-and-fro directions thereof by the travel drive system, whereby the working vehicle can travel laterally either to the right or left with respect to the vehicle body. At this time, the rear wheels are allowed for follow-up steering by means of a turning castor system or can be forcedly steered following the front wheels.

Further, when traveling transversely, or when the traveling mode is switched to the transverse traveling by steering for 90 degrees, the misalignment of straight-ahead driving due to poor road surface conditions and weight imbalance (load fluctuation between front and rear) can be corrected easily by operating the hydraulic operating device slightly to steer both front wheels facing inward or outward through a smaller angle. In addition, by steering both front wheels inward or outward, the direction of the working vehicle can be slightly changed during transverse traveling and the vehicle can also be turned during transverse traveling.

Since the flow divider is capable of controlling the flow to allow specific amount of flow to flow to the control valve for the hydraulic operating device irrespective of the flow rate of pressure oil from the hydraulic pump, steering both front wheels and posture control (correction of straightness) during transverse travel can be achieved and maintained at a specified speed easily and smoothly at all times.

To achieve the second objective mentioned above, the working vehicle with transverse system in Claim 2 of this invention, comprising a pair of right and left front wheels and a pair of right and left rear wheels mounted to a vehicle body, respectively to be capable of steering by 90 degrees, wherein each of the pair of right and left front wheels is linked to a drive shaft on the side of a travel drive system being secured to be capable of freely rotating around a vertical axis with respect to the vehicle body, wherein a rotating means is provided to have a turning cylinder which can be extended and contracted through a control valve by operating a transverse travel switch lever, a transverse control lever is secured separately from said transverse travel lever, to be capable of operating in a specified range, and there are provided a means for detecting a tilt location of said transverse travel lever and a means for detecting the steering angle of the front wheels, whereby outputted detected values from these detecting means are inputted to the valve controller to allow the control valve to be controlled according to an output from the valve controller.

According to the above mentioned configuration of claim 2 of this invention, when changing to a transverse travel operation, a transverse control lever, by inclining (tilting) slightly to one direction, contacts a turning cylinder slightly, and this enables both front wheels to steer outward (steered further) through a smaller angle (in the range of approximately 5 degrees). Therefore, the vehicle can travel transversely, correcting misalignment of straight-ahead driving due to poor road surface conditions and weight imbalance (fluctuation of load between front and rear) during transverse traveling. In addition, to travel to the turning direction in the transverse traveling condition with the rear end following up, the transverse control lever is further tilted to enable the front wheels to face outward even more. Also, to travel to the turning direction in the transverse traveling condition with the front end following up, the transverse control lever is tilted to the opposite side to slightly extend a turning cylinder, which enables both front wheels to face inward (in a slightly reversed state in steering) through a smaller angle (in the range of approximately 5 degrees).

Thus, when the turning cylinder is extended and contracted by tilting the transverse control lever, the detected values of both, a tilt location (tilt angle) of the transverse control lever is detected by the tilt location detecting means and a steering angle (steering volume) of the front wheels is detected by the steering angle detecting means, and the detected value signals from these detecting means are inputted into the valve controller. In addition, the valve controller confirms the difference between both detected signals, outputs the control signals to the control valve so that the steering angle of the front wheels corresponds (matches) to the tilt angle of the transverse control lever, thereby to extend and contract the turning cylinder. At this time, the transverse control lever can control the maximum tilting angle by being operated in the specified range.

Consequently, operating the transverse control lever affects the turning cylinder, enables the turning cylinder to move precisely during adjustment of the angle of the front wheels, thus performing the angle adjustments easily and precisely, and allows stopping at any desired angle.

BEST MODE FOR CARRYING OUT THE INVENTION

A mode of embodiment 1 of the present invention will be explained below using FIGS. 1 through 7.

In the embodiment, components identical or almost identical to those of the conventional art (FIG. 14) mentioned above are labeled with like reference symbols and detailed explanations thereof are omitted.

Reference symbol 1 shows a forklift as an example of a working vehicle, 2 a vehicle body, 3 a front wheel (drive wheel), 4 a rear wheel (steering wheel), 5 a driver's seat, 6 a mast, 7 a linking axle, 8 a tilt cylinder, 9 an outer frame, 10 an inner frame, 11 a lift cylinder, 12 a lift bracket, 13 a fork, 15 a seat, 16 a steering wheel, 17 a front pipe, 18 a rear pipe, 19 a headguard, and 20 a counterweight.

Each of the pair of right and left front wheels 3 and the pair of right and left rear wheels 4 are mounted so as to be steerable by 90 degrees (steerable straight sideways) in relation to the vehicle body 2. That is, the pair of right and left front wheels 3, with its rims 3A being directly mounted on a turnable flange 22 (an example of drive axle) of a hydraulic motor 21 (an example of travel drive system) through a connector 23, are connected to the side of the hydraulic motor 21.

The hydraulic motor 21 is mounted sideways in relation to a vertical plate portion of an inverted L-shaped swing member 24, and a horizontal plate portion of the swing member 24 is secured through a bearing 25 and a vertical axle 26 to be able to turn around the vertical axis 27 in relation to the vehicle body 2. At this time, the vertical axis 27 is configured to be positioned directly above the front wheel 3.

A rotating means 30 to turn the above mentioned swing member 24 is provided and this turning means 30 is configured for both swing members 24 to turn against each other by a common hydraulically operating device. That is, a vertical pin 31 is provided for each horizontal plate portion of both swing members 24, and both vertical pins 31 are positioned in the reverse direction of forward and backward direction in relation to the vertical axis 27.

A link 32 is located in the direction of the width of the vehicle and each edge of the link is connected to the above mentioned vertical pins 31 to be able to turn relatively. A turning cylinder 33 (an example of hydraulically operating device) is positioned in the direction of the width of the vehicle, and its cylinder body itself is connected to one side of the vehicle body 2 to turn relatively. Also, a piston rod is connected to a bracket 34, which was provided in a connected row arrangement of the swing member 24 on the other side. An example of the rotating means 30 is thus constituted by the above mentioned parts 31 through 34.

In each of the pair of right and left rear wheels 4, a rim 4A is attached to be capable of turning on a vertical plate portion of the swing member 35, and a horizontal plate portion of the swing member 35 is attached to be capable of rotating around a vertical axis 38 in relation to the vehicle body 2 through a bearing 36 and a vertical axle 37. At this time, the vertical axis 38 is positioned immediately above the rear wheels 4. Consequently, a pair of right and left rear wheels 4 are allowed for follow-up turning by means of a turning castor system.

An engine 40 is positioned on the side of the above mentioned vehicle body 2, and a pair of hydraulic pumps 41 driven by this engine 40 and a hydraulic pump 50 are provided. In addition, each hydraulic pump 41 is connected to a corresponding hydraulic motor 21 with a piping 42 (hydraulic hose or the like) in order to form a hydraulic drive system (HST System) of a 2-pump, 2-motor type.

The above mentioned hydraulic pump 50 is connected to a working control valve 51 which controls the tilt cylinder 8, the lift cylinder 11, and the like through a piping 52. This piping 52 includes a solenoid valve 53 (an example of switching valve means), and a piping 54 which is switched by the solenoid valve is connected to a control valve for a hydraulically operating device 56 through a flow divider 55.

A return piping 57 which handles the excessive flow volume of the flow divider 55 is joined with the piping 52 which runs to the above mentioned operating control valve, and an anti reverse back-flow valve 58 is provided in the return piping 57. 59 depicts a tank.

The following is the explanation of the operation of the above mentioned mode of embodiment 1.

Solid lines in FIG. 1, FIG. 3, FIG. 4 and FIG. 5 show the normal travel. At this time, the solenoid valve 53 is turned off and a full flow of pressure oil from the hydraulic pump 50 is flowing to the operating control valve 51 through the piping 52. The turning cylinder 33 is positioned in the center, and due to the link 32 being transferred to the center, right and left front wheels 3 and right and left rear wheels are steered in the forward and backward directions. The forklift 1 can be driven to travel by an operator sitting on the seat 15 of the driver's seat 5 by manipulating the steering wheel 16.

Then, by operating a lifting lever to actuate the lift cylinders 11 through the working control valve 51 to raise and or lower the forks 13 through the lift brackets 12 along the mast 6, the expected fork operations can be executed. Further, by operating a tilting lever to actuate the tilt cylinders 8 to move the mast 6 around the linking axle 7 (that is to tilt), posture of the forks 13 can be varied through the lift brackets 12 and the like.

Figure 1:
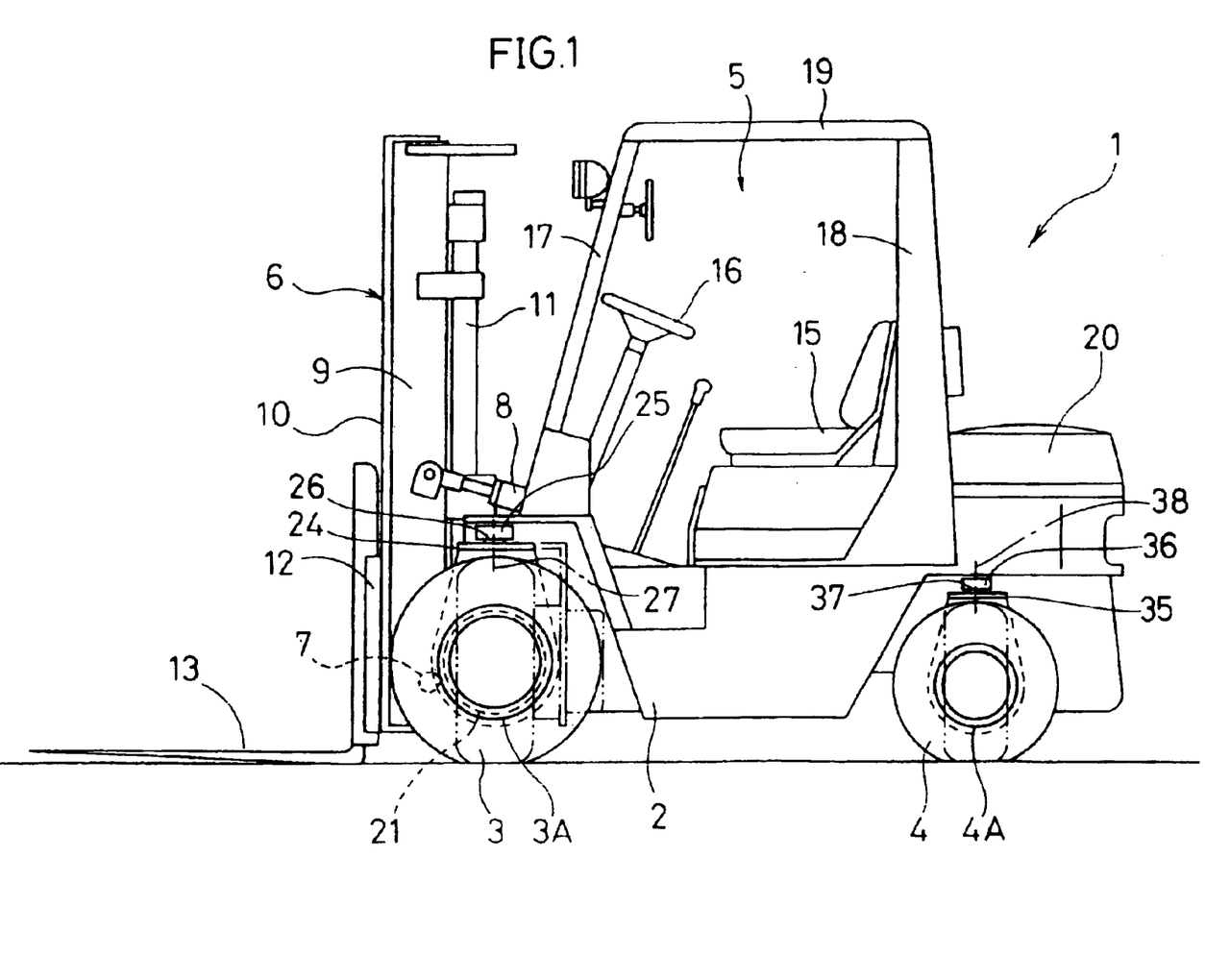
FIG. 1 is a side view of a working vehicle with transverse system, showing a first embodiment of the present invention.
Figure 2:
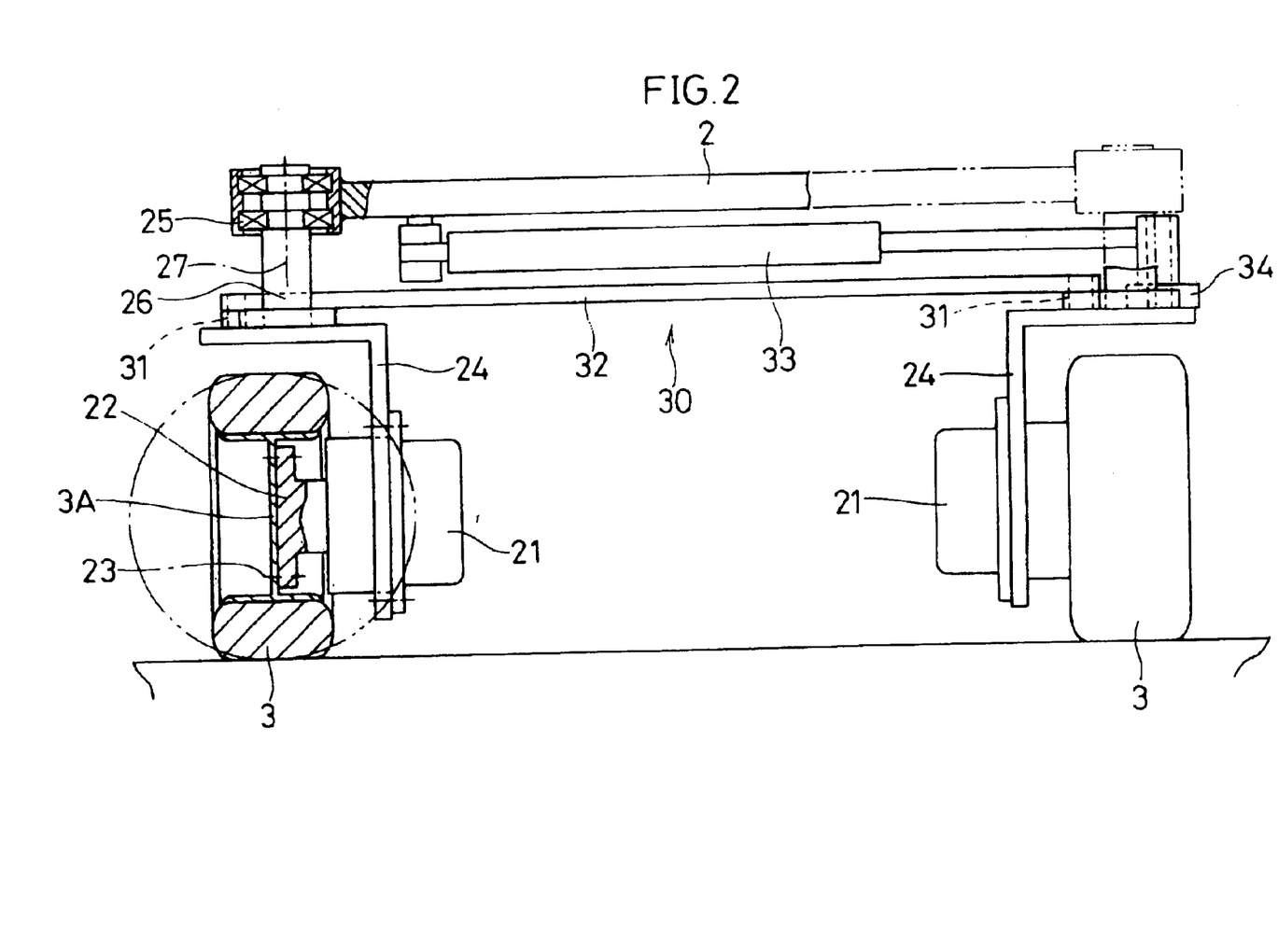
FIG. 2 is a rear view of a partially cutaway cross section of a front wheel area of the working vehicle with transverse system.
Figure 3:
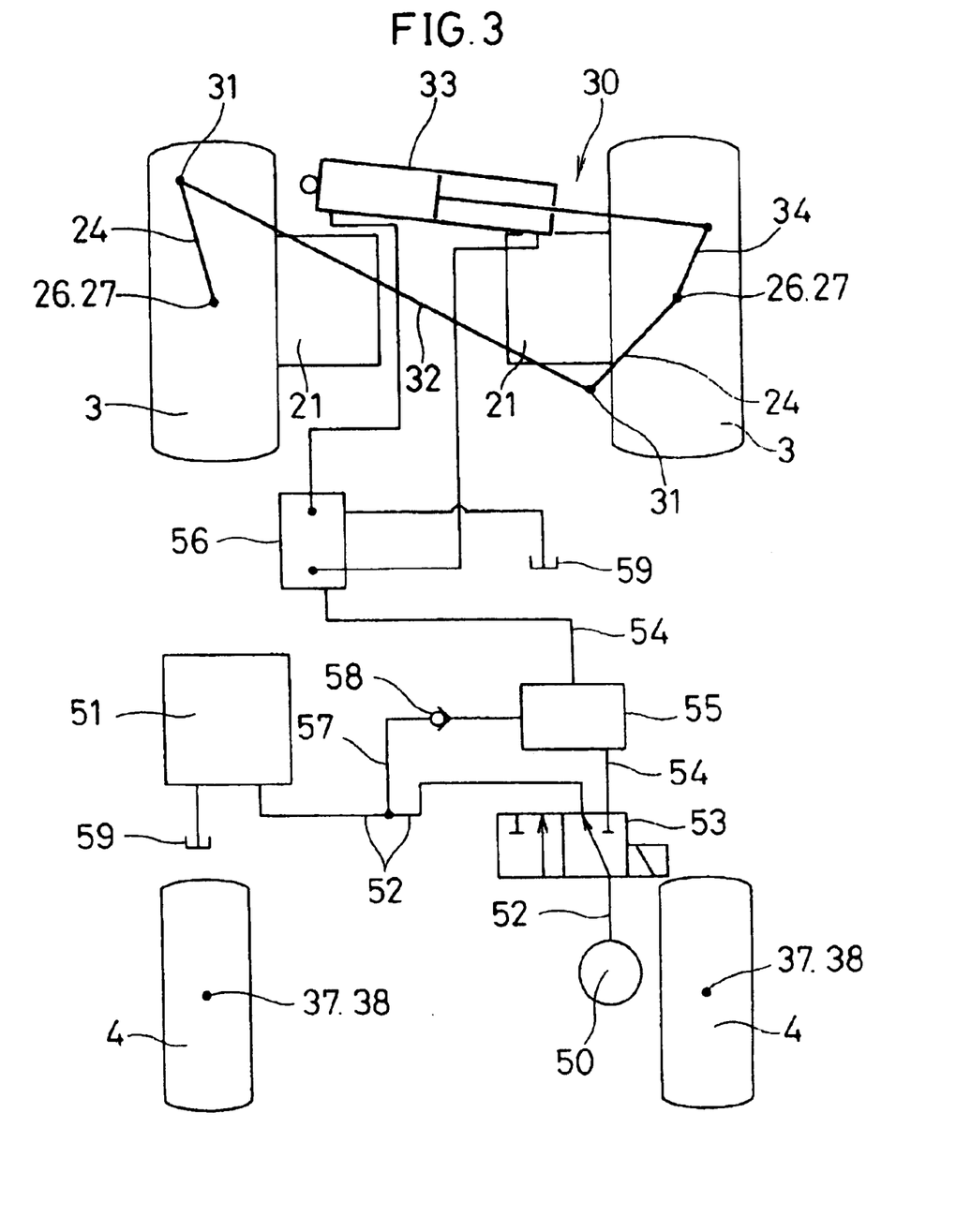
FIG. 3 is a systematic diagram of the working vehicle with transverse system during normal travel.
Figure 4:
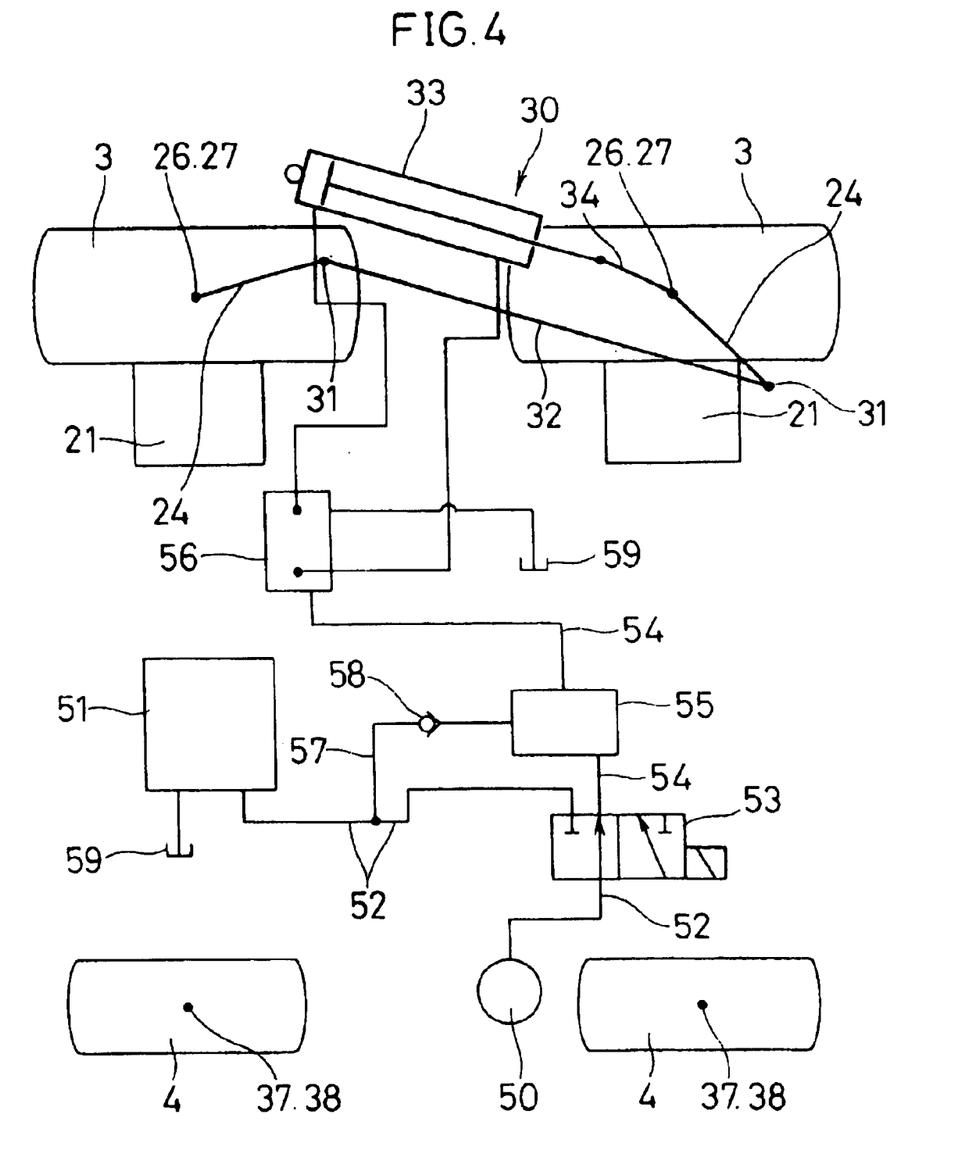
FIG. 4 is a systematic diagram of the working vehicle with transverse system during transverse travel.
Figure 5:
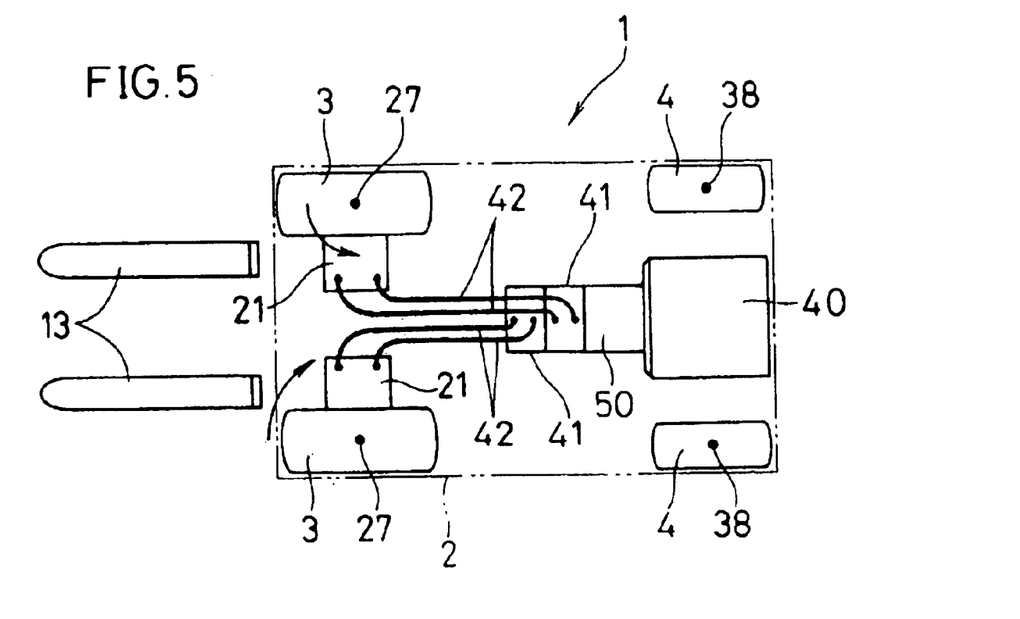
FIG. 5 is a schematic top view of the working vehicle with transverse system during normal travel.
Figure 6:
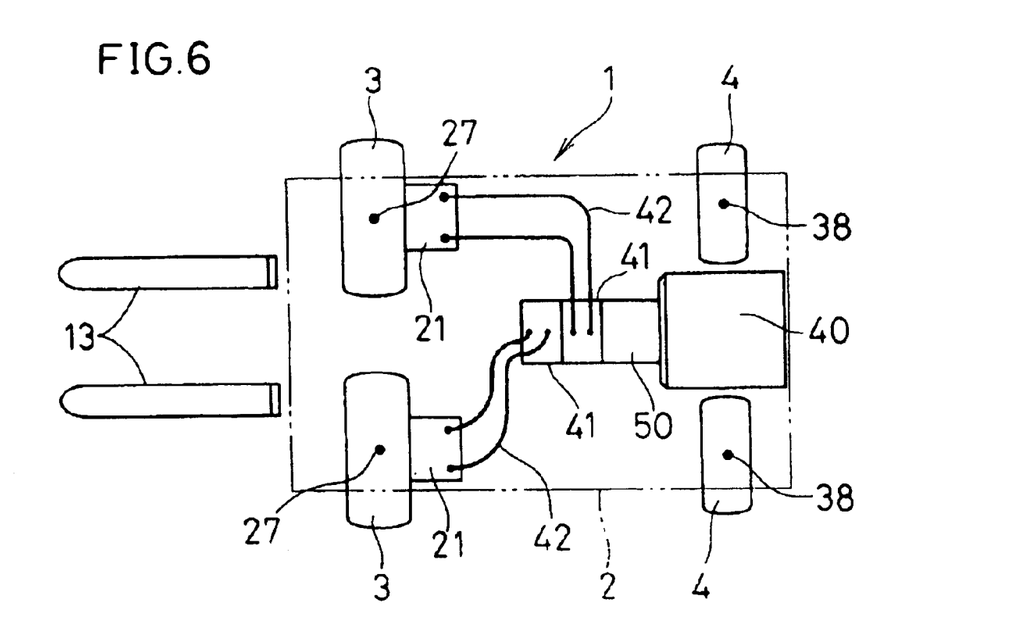
FIG. 6 is a schematic top view of the working vehicle with transverse system during transverse travel.

When changing from a normal travel operation to a transverse travel operation, a lever-style transverse travel mode switch (not shown) is operated to send a signal to the solenoid valve 53 to switch, that is to be turned on, as shown in FIG. 2. Thereby, a full flow of pressure oil from the hydraulic pump 50 is fed to the flow divider 55 through the piping 54. Then the pressure oil is controlled by the flow divider 55 to allow a specified amount of pressure oil to flow to the control valve for a hydraulic operating device 56 through the piping 54. The excessive flow except for the controlled oil by the flow divider 55 is fed to the working control valve 51 through a return piping 57.

The control valve for the above mentioned hydraulically operating device controls only the pressure oil required for steering by operating the control lever to feed the turning cylinder. Thus, for example, the turning cylinder 33 can be contracted, and the swing members 24 can be turned around the vertical axis 27 together with the transfer of the link 32. At this time, due to the link 32 being positioned crosswise in relation to the right and left front wheels 3, both swing members 24 are turned against each other around the vertical axis 27, thereby allowing both front wheels 3 to steer (steer straight sideways) by 90 degrees in relation to the vehicle body 2, as shown by the virtual lines in FIGS. 2, 3, and 4, and in FIG. 6.

Since each front wheel 3 is integrated with each hydraulic motor 21, each front wheel can readily and smoothly be steered by 90 degrees. Further, since the vertical axes 27 are positioned immediately above the front wheels 3, the front wheels 3 can be made compact and steerable by 90 degrees.

When the front wheels 3 are steered as stated above, a sensor detects this change of direction of these front wheels 3 being steered straight sideways, and activates an indicator lamp, thereby allowing the transverse travel mode to be effected. Therefore, by supplying hydraulic pressure from a pair of hydraulic pumps 41 driven by the engine 40, to the corresponding hydraulic motor 21 through the piping 42 by operating the to-and-fro control at the driver's seat 5, the front wheels 3 can be driven in the to-and-fro directions, thereby allowing the forklift 1 to travel transversely to both in right and left directions.

At the same time, the hydraulic motors 21 corresponding to the right and left front wheels 3 are controlled to turn against each other. The pair of right and left rear wheels 4 having a turning castor system can perform a follow-up turning around the vertical axis 38.

Figure 7A:
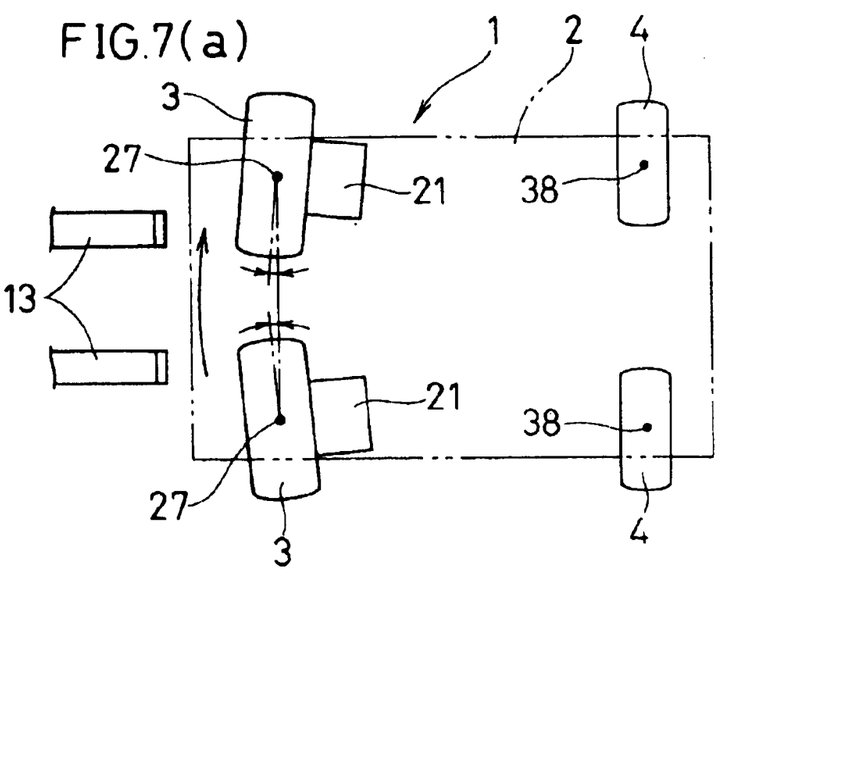
FIG. 7 is a schematic top view of the working vehicle with transverse system during an adjustment of transverse traveling.
Figure 7B:
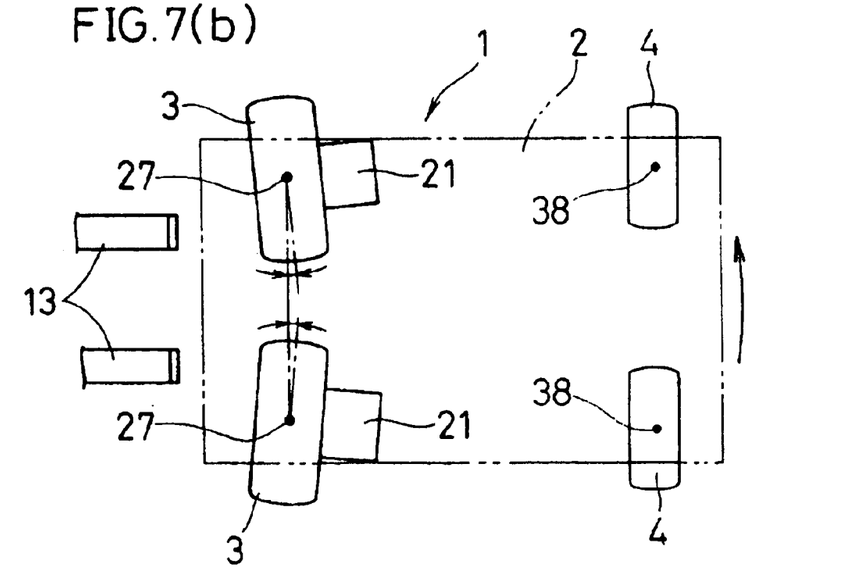

When traveling transversely, that is, when in the transverse mode, both front wheels 3 are steered by 90 degrees (steered straight sideways) in relation to the vehicle body 2, both front wheels 3 can be steered inward (slightly steered in reverse) through a smaller angle (in the range of approximately 5 degrees) by slightly extending the turning cylinders 33 as shown in FIG. 7(a), and or both front wheels 3 can be steered outward (steered further) through a smaller angle (in the range of approximately 5 degrees) by slightly contracting the turning cylinders 33 as shown in FIG. 7(b). This makes it easy to correct the misalignment of straight-ahead driving due to poor road surface condition or weight imbalance (fluctuation of the load in front and rear).

This steering (moving) of both front wheels 3 inward and outward through a smaller angle (in the range of approximately 5 degrees) enables the forklift 1 to change its traveling direction to some extent while traveling transversely. Also, if structurally possible, taking a steering angle of both front wheels 3 larger than 5 degrees or more makes it possible to turn during the transverse travel.

As mentioned above, since a specified amount of pressure oil flows to the control valve for the hydraulically operating device 56 by the flow divider 55 irrespective of the number of revolution of the engine 40, steering of the front wheels 3 and posture control (correction of the straightness) can be affected at certain speeds at all times. For instance, when traveling transversely at slow speed, though an accelerator pedal is lightly pressed and the engine revolution is low, posture correction can still be adequately made. Even if the engine revolution is at the maximum, the wheels will not suddenly change directions.

The transverse traveling capability as mentioned above, for example, makes it easy to transport elongated objects using the forks 13. However, featured with a 2-pump 2-motor type hydraulic drive system as a drive system in Forklift 1, when making turns in the normal travel mode as mentioned above, the turning direction of the front wheels 3 and the difference in the number of revolutions are manipulated by the steering wheel, and when traveling transversely, this turning system is stopped electrically.

In the mode of embodiment 1 mentioned above, the solenoid valve 53 is shown as a switching valve means, however, a valve which can be switched mechanically by the use of a lever may also be employed.

In the mode of embodiment 1 mentioned above, a pair of right and left rear wheels 4 are shown, however, a type may be employed, wherein a pair of right and left rear wheels 4 are placed in a parallel location in the center area of the width of the vehicle.

The above mentioned embodiment 2 will be explained below using FIGS. 8 through 13. In the embodiment 2 of the present invention, components identical or almost identical to those of the above mentioned embodiment 2 (FIGS. 1 through 7) are labeled with like reference symbols and detailed explanations thereof are omitted.

A transverse travel switch lever 60 is located in the front guard area of above mentioned driver's seat 5. This transverse travel switch lever 60 is configured to be able to tilt in a front-and-rear direction through a supporting axis 61 in the right-and-left directions, and by tilting from a neutral position, an operating body 62 underneath is configured to operate a transverse travel mode switch 63. This transverse travel mode switch 63 is connected to a valve controller 77.

The above mentioned driver's seat 5 has an armrest 70 located near a steering wheel 16, and this armrest has a lifting lever 71 to operate the lift cylinders 11, a tilt lever 72 to operate the tilt cylinders 8, and a transverse travel control lever 73 to operate the turning cylinders 33.

This transverse travel control lever 73 is configured to be able to tilt in the front-and-rear direction through a supporting axis 74 in the left-and-right direction, and an L-shaped guiding groove 70A of a specific length (approximately 100 mm) is formed in the direction of front-and-rear to regulate the maximum tilt angle of the front and rear (±15 degrees) which is within in the specified range.

Additionally, the transverse travel control lever 73 area is provided with a tilt location detecting means for the transverse travel control lever 73. That is, a tilt location detecting sensor 75 (an example of tilt location detecting means) is provided to detect the tilt location of the transverse travel control lever 73 which is located opposite to the transverse travel control lever 73 and supporting axis 74.

Further, the front wheels 3 portion is provided with a steering angle detecting means. That is, for example, the vertical axis 26 is provided with a tilt volume sensor 76 (an example of steering angle detecting means) which detects the steering angle of the front wheels 3 (steering volume) by detecting the volume of this vertical axis 26. The tilt location detecting sensor 75 and the tilt volume sensor 76 are connected to the previously mentioned valve controller 77, and the valve controller 77 is connected to a control valve 79 which is secured to the piping 78 leading to the above mentioned turning cylinder 33.

The following is the explanation of the operation of the above mentioned embodiment 2.

Figure 8:
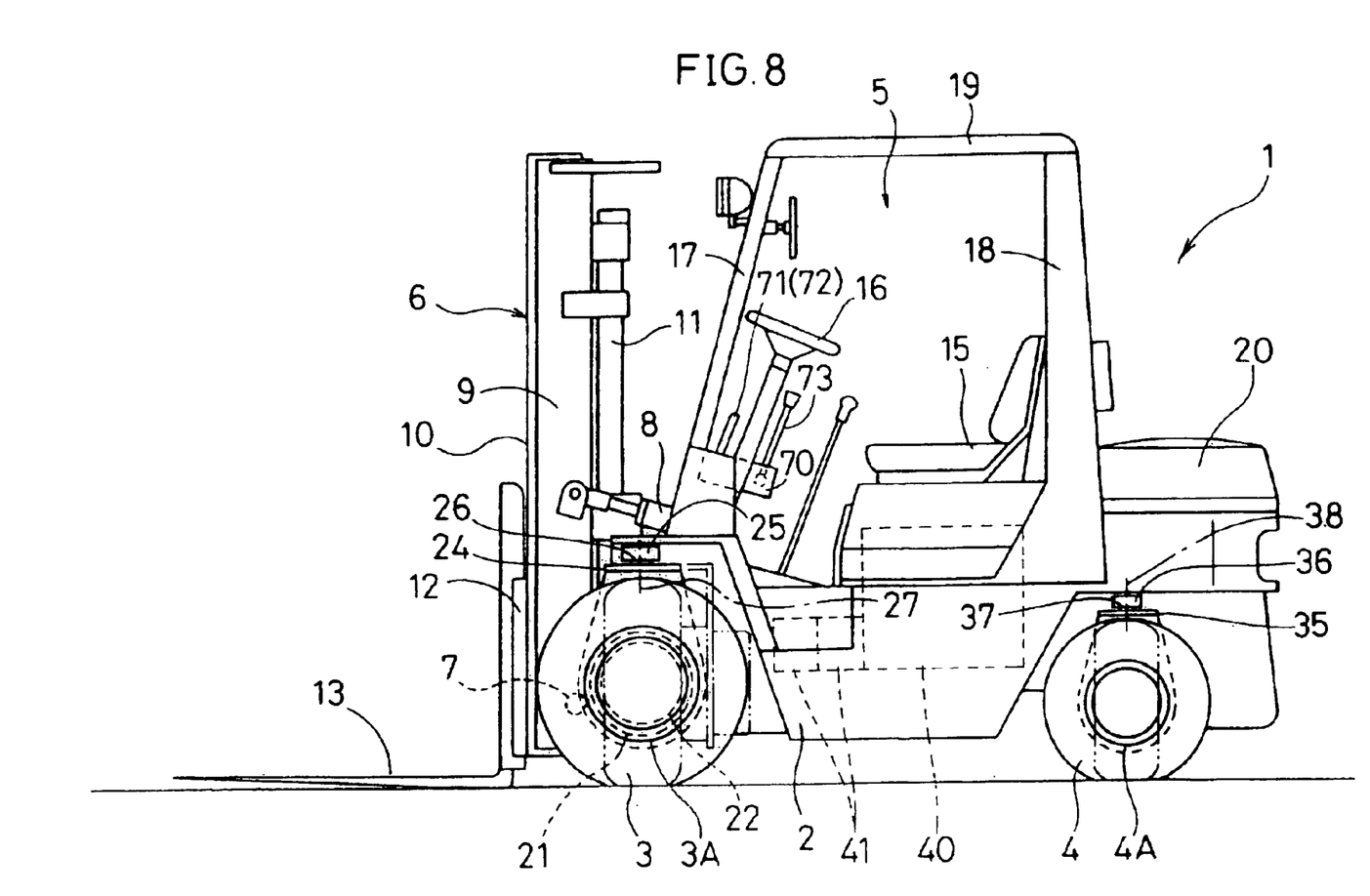
FIG. 8 is a side view of a forklift with transverse system during normal travel, showing a second embodiment of the invention.
Figure 9:
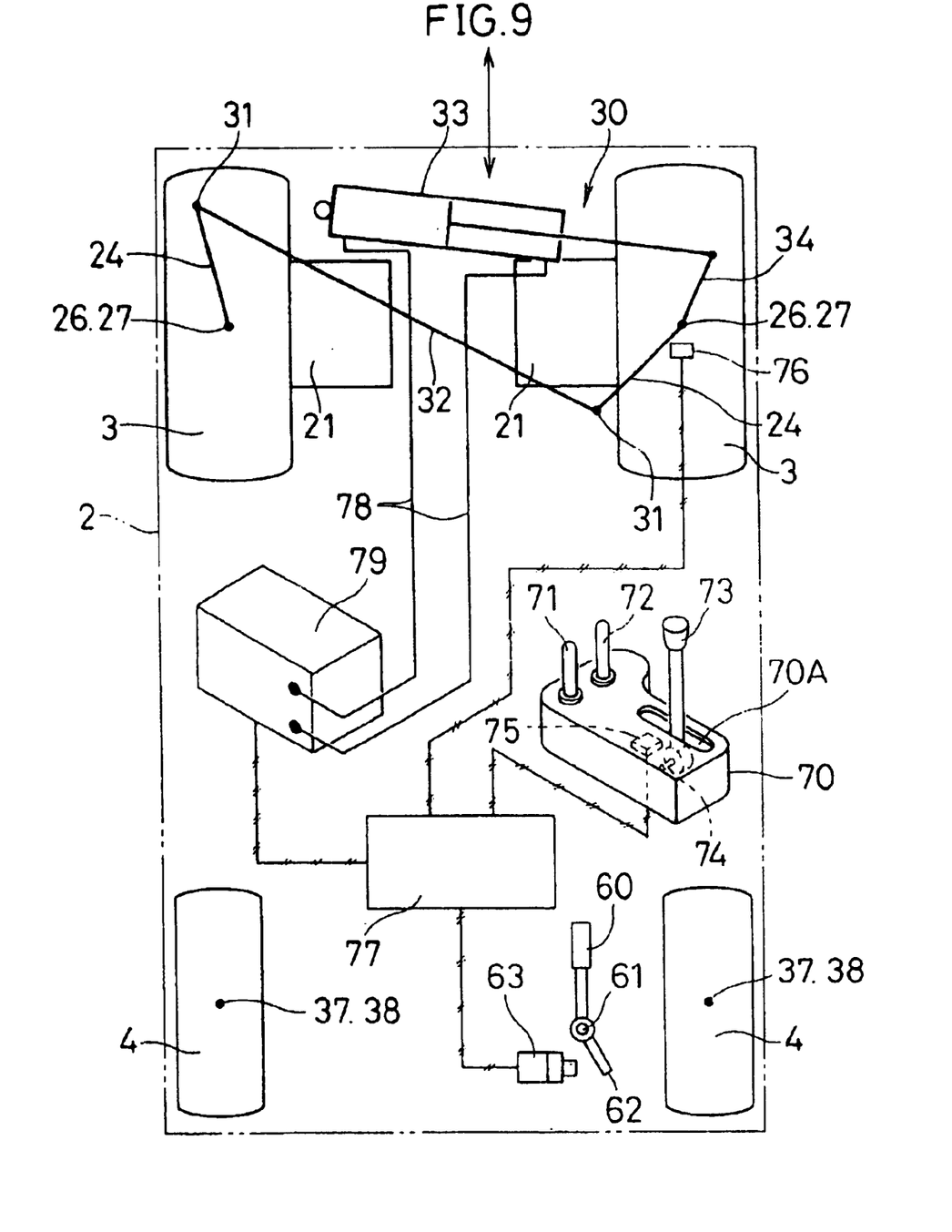
FIG. 9 is an explanatory drawing of the forklift with transverse system during normal travel.

The solid lines in FIGS. 8 and 9 show the normal traveling time. At this time, right and left front wheels 3 and right and left rear wheels 4 are steered in the direction of front-and-rear and transverse travel switch lever 60 and transverse travel control lever 73 are positioned neutral as shown with solid lines in FIGS. 9 and 11. A forklift 1 like this can be driven to travel by manipulating the steering wheel 16 by an operator sitting on the seat 15 of the driver's seat 5.

A lift lever 71 is used to effect the lift cylinders 11 to raise or lower the forks 13 along the mast 6 to accomplish expected fork operations. A tilt lever 72 is operated to actuate the tilt cylinders 8 to move the mast 6 around the linking axle 7 to allow the forks 13 to change posture.

Figure 10:
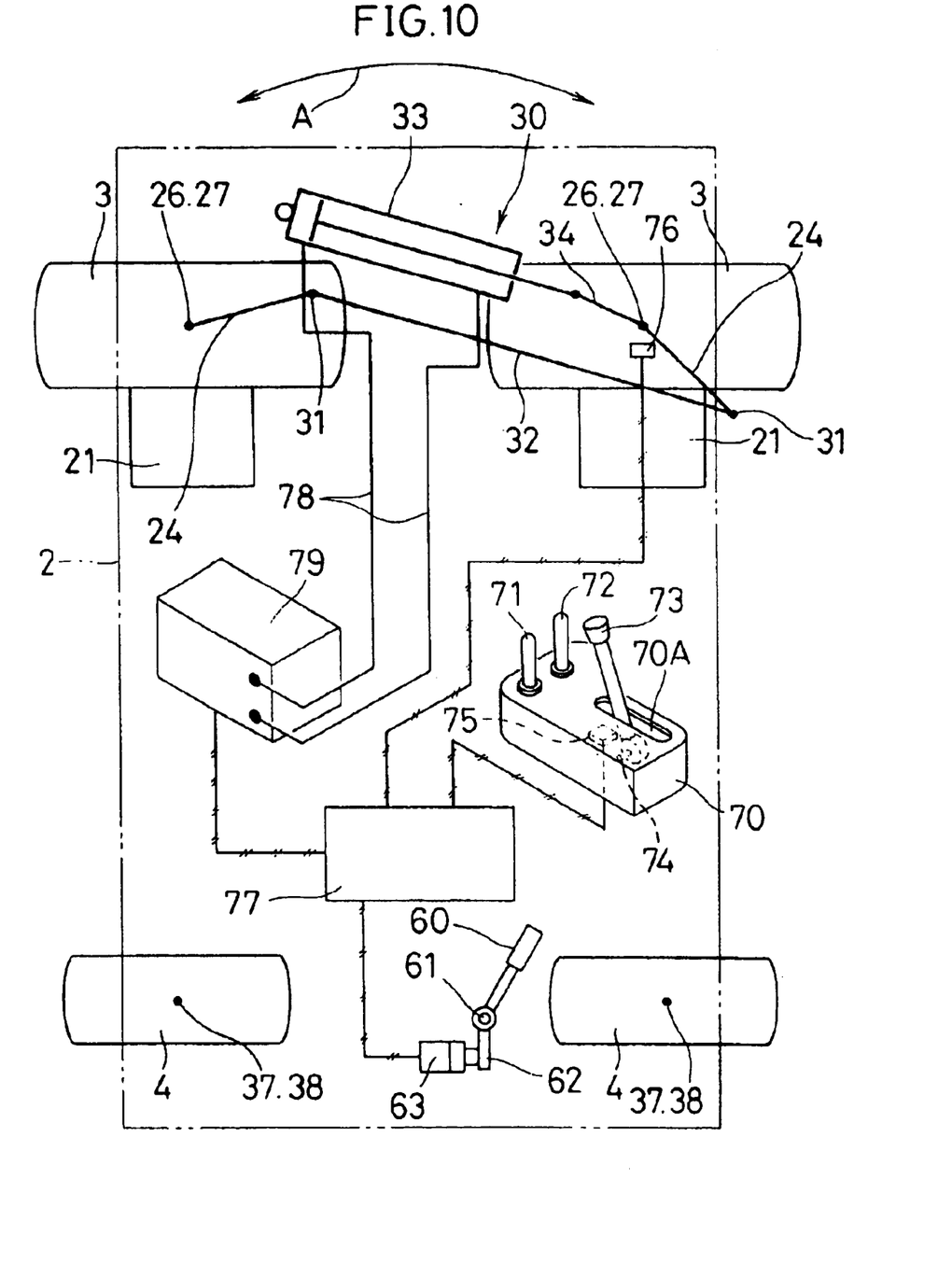
FIG. 10 is an explanatory drawing of the forklift with transverse system during transverse travel.

When switching from the normal travel mode to the transverse travel mode, the transverse travel switch lever 60 is manipulated first, and then, as shown in FIG. 10, the operating body 62 is used to turn the transverse travel mode switch 63 on. This then, inputs a turned-on signal from the transverse travel mode switch to the valve controller 77 to allow the valve controller 77 to output the control signal to the control valve 79 to result in the turning cylinder 33 either extending or contracting. This extension or contraction of the turning cylinder 33 lets the swing members 24 around the vertical axis 27, and as shown with virtual lines of FIG. 8 and a diagram of FIG. 10, the front wheels 3 are steered straight sideways in relation to the vehicle body 2.

Figure 13A:
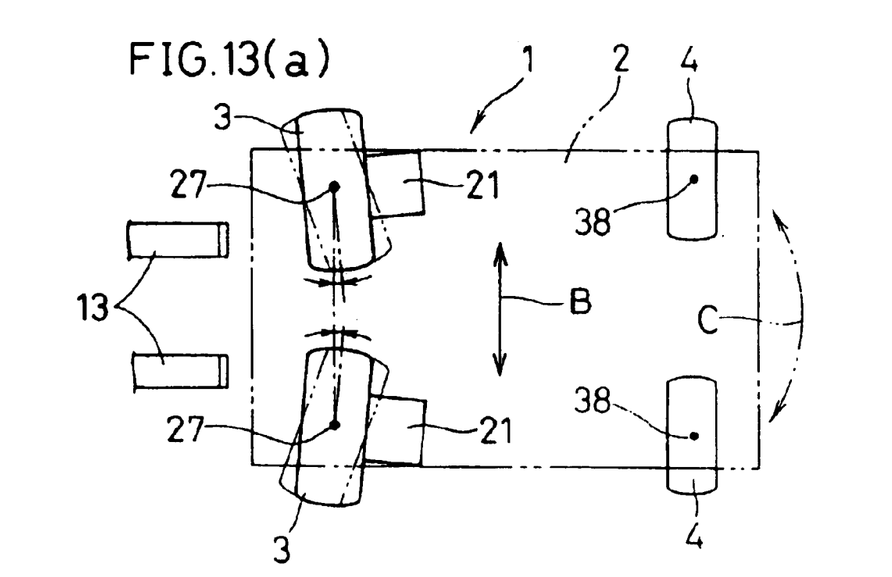
FIG. 13 is a schematic top view of the forklift with transverse travel during an adjustment in transverse travel.

Thus, the sensor detects that the front wheels 3 are steered straight sideways, and activates an indicator lamp, thereby allowing the lateral traveling mode to be effected. Consequently, supplying the oil pressure from the hydraulic pump 41 to the hydraulic motor 21 drives the front wheels 3 in the to-and-fro direction to allow the forklift 1 to travel to the right and left transversely. When traveling transversely like this, that is, when both of the front wheels 3 are steered by 90 degrees in relation to the vehicle body 2 (steered straight sideways), although the difference can be seen between loaded time and unloaded time, the vehicle turns to the front spinning direction A shown in FIG. 10 with the rear wheels 4 as a resistance. At this time, the transverse travel control lever 73 is slightly inclined forward (tilted down) as indicated by virtual line X in FIG. 11, to allow the turning cylinder 33 to be slightly contracted so that both of the front wheels 3 can be steered outward (steered even further) through a smaller angle (range of approximately 5 degrees) as indicated by solid lines in FIG. 13(*a*). In this way, the vehicle can run transversely in a straight sideway direction B while correcting the misalignment of straight-ahead driving due to poor road surface conditions and weight imbalance (load fluctuation between front and rear) at transverse driving.

When traveling in the rear spinning direction C in transverse traveling, the transverse travel control lever 53 is tilted even farther to the front to steer the front wheels 3 more outward as indicated with virtual lines in FIG. 13(*a*). The outward steered condition of the front wheels 3 is adjusted as needed depending on the load condition of the rear wheels 4.

Figure 11:
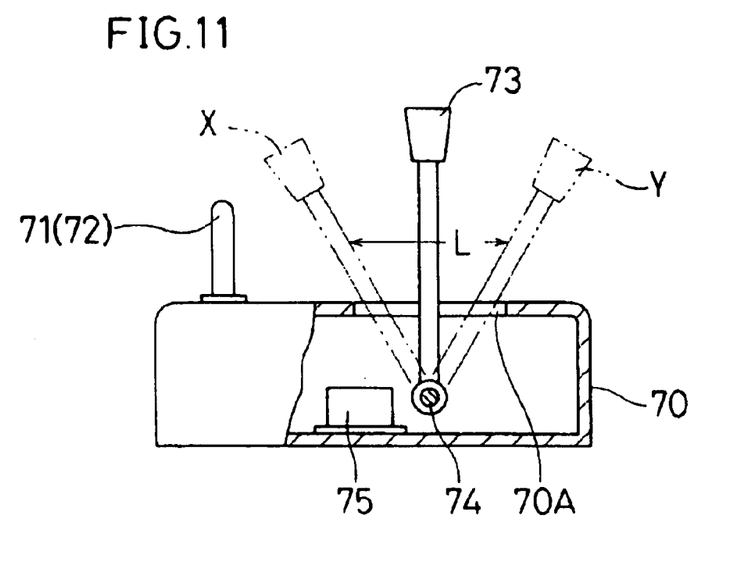
FIG. 11 is a side view of a partially cutaway cross section of an armrest area of the forklift with transverse travel.
Figure 13B:
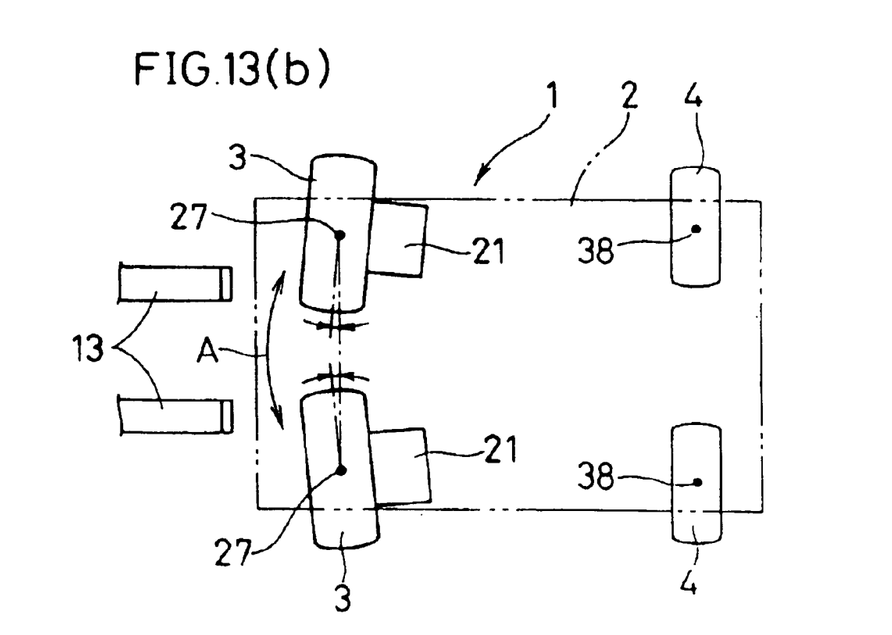

Further, when turning to the front following direction A at the transverse travel mode, as indicated with virtual lines Y in FIG. 11, the transverse travel control lever 53 is tilted backward to slightly extend the turning cylinder 33 to allow both front wheels 3 to be steered inward (steered slightly in reverse) through a smaller angle (in the range of approximately 5 degrees) as shown in FIG. 13(b).

As mentioned above, when extending and contracting the turning cylinder 33 by tilting the transverse travel control lever 60 forward or backward, a tilt location (tilt angle) of this transverse travel control lever 60 is detected by the tilt location detecting sensor 75 and the steering angle of the front wheels 3 (steering volume) is detected by the tilt volume detecting sensor 76, so that the detected value signals from the detecting sensors 75 and 76 are input to the valve controller 77.

Figure 12:
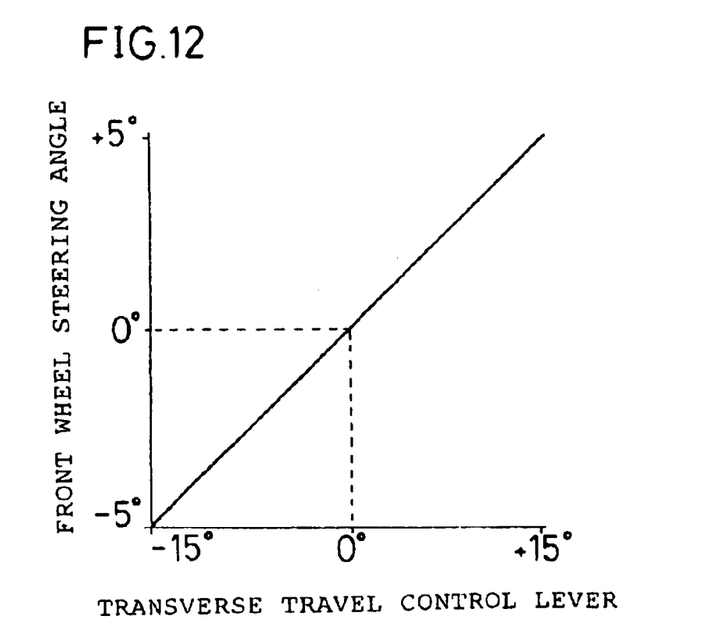
FIG. 12 is a graph explaining the forklift with transverse travel.

The valve controller 77, then, confirms the difference of these two value signals based on FIG. 12, and outputs the control signals to the control valve 79 so that the steering angle of the front wheels 3 matches the tilt angle of the transverse travel control lever 73, and then allows the turning cylinder 33 to extend and contract. The output of the control signals to the control valve 79 is maximum when the difference between both detected signals is 20% or more, and is half the output when it is 20% or less. Additionally, the transverse travel control lever 73 is controlled by the guide groove 70A for its maximum tilt angle of forward and backward, which allows it to operate within the specified range.

By manipulating the transverse travel control lever 73, the turning cylinder 33 is actuated, and when adjusting the angle of front wheels 3, the turning cylinder 33 is operated accurately, therefore, the adjustment of the angle of the front wheels 3 is made easily and accurately as well as stopping at the required angle.

Although a counterbalance type forklift 1 was presented as a working vehicle in the embodiments mentioned above, large size transport vehicles, loaders, side forklifts and the like may also be likewise operated. The embodiments mentioned above show the hydraulic motor 21 connected to the hydraulic pump 41 driven by the engine 40, as a travel drive system, however, a battery loaded vehicle may use an electric motor as a travel drive device. In the embodiments mentioned above, right and left common type is shown as a turning cylinder (hydraulic operating device) 33 using rotating means 30, however, right and left separate types may also be used.

Although the pair of right and left rear wheels 4 used in the embodiments mentioned above are of a type having a castor system capable of performing a follow-up turning of the wheels, they may also be of the same type as for the front wheels 3, which allows the wheels to be forcedly steered by a cylinder or the like. Alternatively, one of the pair of right and left rear wheels 4 may be of a type performing steering by means of a steering wheel, while the other being of a follow-up castor type. In this case, when switching to a transverse travel mode, one of the rear wheels 4 is forcedly steered by the cylinder or the like.

What is claimed is:

1. A working vehicle with a transverse system which can steer front wheels and rear wheels mounted respectively, comprising a pair of right and left front wheels and right and left rear wheels mounted to a vehicle body, respectively to be steerable, each of said pair of right and left front wheels being linked to a drive shaft on a travel drive system side, wherein each said travel drive system is secured to a swing member capable of rotating around a vertical axis with respect to the vehicle body, a rotating means is provided for rotating the swing members, said rotating means being driven to turn both of the swing members against each other by means of a hydraulic operating device, and a switching valve means is secured to a piping between a hydraulic pump and a working control valve, said piping on a side to be switched by said switching valve means being connected to a control valve for a hydraulic operating device through a flow divider for controlling an amount of flow of pressure oil.

2. The working vehicle with a transverse system according to claim 1, wherein an excessive amount of flow of pressure oil except for that controlled by the flow divider is fed to the working control valve through a return piping.

* * * * *